(12) United States Patent
Tamai et al.

(10) Patent No.: US 6,376,927 B1
(45) Date of Patent: Apr. 23, 2002

(54) HYBRID ELECTRIC DRIVE AND CONTROL METHOD THEREFOR

(75) Inventors: Goro Tamai; Tony T. Hoang, both of Warren, MI (US); Robert Charles Downs, La Jolla, CA (US)

(73) Assignee: Saturn Corporation, Troy, MI (US)

( * ) Notice: Subject to any disclaimer, the term of this patent is extended or adjusted under 35 U.S.C. 154(b) by 0 days.

(21) Appl. No.: 09/483,986

(22) Filed: Jan. 18, 2000

(51) Int. Cl.[7] .............................. E05C 1/06; E05C 1/12; E05C 7/00
(52) U.S. Cl. ...................... 290/40 C; 290/31; 290/32; 290/40 R; 290/40 A; 290/40 B; 290/40 F
(58) Field of Search ............................ 290/40 A–40 D; 180/65.3, 65.4, 65.5; 322/21, 40

(56) References Cited

U.S. PATENT DOCUMENTS

| | | | |
|---|---|---|---|
| 2,574,573 A | 11/1951 | Libby | |
| 3,497,043 A | 2/1970 | Leonard | |
| 4,304,107 A | 12/1981 | Fall et al. | 64/27 |
| 4,509,389 A | 4/1985 | Vahratian et al. | 74/695 |
| 4,951,788 A | 8/1990 | Martin | 192/3.3 |
| 5,117,931 A | * 6/1992 | Nishida | 180/65.2 |
| 5,129,493 A | 7/1992 | Edmunds | 192/3.29 |
| 5,343,970 A | * 9/1994 | Severinsky | 180/65.2 |
| 5,637,987 A | 6/1997 | Fattic et al. | 322/40 |
| 5,698,905 A | 12/1997 | Ruthlein et al. | 290/32 |
| 5,789,823 A | 8/1998 | Sherman | 290/47 |
| 5,842,534 A | * 12/1998 | Frank | 180/65.2 |
| 5,984,034 A | * 11/1999 | Morisawa et al. | 180/65.2 |
| 6,119,799 A | * 9/2000 | Morisawa et al. | 180/65.2 |
| 6,183,389 B1 | * 2/2001 | Tabata | 477/5 |

* cited by examiner

Primary Examiner—Elvin Enad
(74) Attorney, Agent, or Firm—Anthony Luke Simon

(57) ABSTRACT

A fuel management control method for a hybrid electric vehicle drive having an internal combustion engine and an electric motor arranged in parallel such that both can propel the vehicle; the system including an electric motor driven fuel pump and a programmable microprocessor; and wherein the method further includes monitoring vehicle speed and sensing braking pressure and directing signals of both vehicle speed and braking to the microprocessor and processing such inputs in accordance with an aggressive fuel management program including shut-off of fuel flow to the gas engine in response to vehicle braking at vehicle speeds above a predetermined maximum hysteresis speed and maintaining the fuel shut off during vehicle coasting above a predetermined speed while controlling the electric motor to provide regenerative braking or vehicle start during such fuel shut off modes of operation.

25 Claims, 10 Drawing Sheets

HYBRID ELECTRIC DRIVE AND CONTROL METHOD THEREFOR

BACKGROUND OF THE INVENTION

1. Field of the Invention

This invention relates to hybrid electric vehicles and more particularly to drive systems and fuel controllers for such systems.

2. Description of the Prior Art

U.S. Pat. No. 5,789,823 has an engine and/or the electric motor operated to power the vehicle. In order to provide for a desired control of power, a one-way clutch is connected between a lock-up clutch and a start clutch. The arrangement is operative to provide a high torque input from the electric motor through the torque converter turbine to the engine. Once the engine starts, the start clutch is disengaged and the engine drive is directly connected through the one-way clutch that is operative to lock in the direct drive direction so as to power the torque converter impeller or pump. Once full power is transmitted through the torque converter to the transmission, the lock-up clutch is operated to produce a 1:1 drive to the transmission in bypassing relation with the torque converter. In this configuration the one-way clutch is locked up in the drive direction during initial torque converter operation and is operative to free wheel in the drive direction when the electric drive rotor is rotating faster than the engine speed so as to permit overrunning or freewheeling between the engine and the rotor of an electric motor. Hence, the location of the one-way clutch and its operation is predicated upon an arrangement in which the stator of the electric motor is directly connected to the input housing of the torque converter for propelling the vehicle during various modes of highway operation. There is no provision for lock-up by the one-way clutch during vehicle coasting or during regenerative braking.

While suitable for its intended purpose the arrangement of the one-way clutch in the torque converter of the '823 patent does not provide for a continuous free-wheel connection between the engine and the impeller or pump of a torque converter in the drive direction and it is not operative to lock upon overdrive from the transmission to the engine during vehicle coasting.

One example operating characteristic of certain prior art torque converters including the combination shown in the '823 patent is that in operating modes in which the transmission selector is in a forward drive and the accelerator and brake are operated such that the vehicle is coasting down in speed and fuel flow to the engine is reduced to idle speed requirements, the engine can stall or its speed can fall off or droop. In such cases the vehicle driver may feel the pull of the engine when it is restarted in the case of stall or when it is operated to pull back from the drooped speed to the coasting speed of the vehicle as manifested by the vehicle wheels back driving the transmission through the output shaft of the vehicle drive system. Furthermore, advantages of regenerative braking and charging of a battery pack are lost if the engine must be restarted.

Other hybrid electric motor and internal combustion engine drive systems in a hybrid electric vehicle (HEV) are shown in U.S. Pat. Nos. 5,637,987 and 5,698,905. The '987 system includes an energy management control that selects either gas engine or electric motor drive depending upon the vehicle drive mode. The control for the '987 patent does not control the HEV by sensing vehicle speed in a brake start speed range; a hysteresis speed range and a "regen-able" speed range by use of a brake pedal position and pressure sensing sequence. The term "regen-able" is coined to indicate that regenerative braking is possible. Additionally the '987 patent requires a gear set interposed between an engine and a transmission to manage the energy provided to drive the vehicle. The '905 system includes a gas engine but it is used to power a generator for producing a source of electric current for driving an electric motor that constitutes the drive for the vehicle. Neither system provides for an aggressive management of fuel flow to a gas engine during vehicle coasting operations in order to improve total fuel consumption. Furthermore, neither system discloses or suggests that the internal combustion engine be directly coupled to a transmission drive that is operative to supply primary power to a wheeled vehicle above a predetermined vehicle speed.

Additionally, the prior art systems do not provide a method for controlling fuel flow in a system that is configured to prevent engine stall so as to avoid the need for electric motor restart of an engine following a coasting mode of forward speed operation when the engine speed falls below a selected drop-to-neutral speed.

Furthermore, the prior art systems do not provide an internal combustion engine and electric motor combination that is normally coupled in parallel driving relationship to a drive transmission of a wheeled vehicle and wherein the electric motor can be used to start the engine and can be conditioned in response to brake pedal pressure to cause a proportional regenerative braking for charging a battery pack that can be used when the vehicle is stopped to operate the electric motor for starting the internal combustion engine.

SUMMARY OF THE INVENTION

The present invention includes a hybrid-electric vehicle (HEV) that has an internal combustion engine connected to drive a multi-speed automatic transmission that can if desired include a torque converter.

Additionally the HEV includes an electric machine having a rotor connected to the crankshaft of the engine and a stator and a controller for selectively controlling the electric machine to serve as an electric starter or as a generator for regenerative braking during vehicle drive so as to charge an associated battery pack. A fuel controller is provided that is operative in response to vehicle braking and further is operative to respond to vehicle speeds in different ranges to improve fuel consumption characteristics of the vehicle.

The advantage of such a drive arrangement is that a fuel control can be provided that will entirely cut off fuel flow during vehicle decelerations and stops. The integration of an electric motor directly connected to the crankshaft of the internal combustion engine allow the shut off of fuel and restart of the gas engine to be conducted virtually transparent to the driver.

The control of the gas engine and the electric motor is according to routines that operated in conjunction with the usual operation of an engine driven automatic transmission system for driving the wheels of a vehicle. In such systems the engine is driven by an electric motor starter and fuel is supplied during an engine startup mode. The transmission is placed in a drive mode and the vehicle is accelerated by depressing an accelerator pedal for supplying more fuel and air to the engine. When the vehicle is up to speed the torque converter lock-up clutch is applied and the transmission is, for example, in a forward speed selection position such that the vehicle cruises under the power of the gasoline engine and if desired, a portion of the cruise power can be supplied by the electric motor (especially at lower startup speeds).

In such systems, when the accelerator pedal is released, the fuel can be cut depending on vehicle speed and gear setting. Above a prescribed vehicle speed, if the torque converter clutch is locked or if a reverse locking one-way clutch is operable to lock the turbine and impeller of a torque converter as set-forth in copending U.S. Ser. No. 09/483,987, office file H-204481, the electric motor can be controlled to deliver regenerative braking during decelerations to recharge a battery pack.

Under one control routine, when the brake pedal is depressed a brake sensor is operative to produce a signal that is processed by a microprocessor to maintain the fuel fully cut-off for the entire deceleration of the vehicle while in the regen-able speed range of operation.

In a lower speed range of vehicle speeds in the brake-start range of operation, if the brake pedal is released during deceleration, the engine can be restarted with the release of the brake pedal and a re- supply of fuel.

In accordance with another aspect of the invention when the vehicle speed is in a creep speed range as in the case of a usual vehicle launch, the fuel is not cut off on either braking or accelerator pedal release until the road speed of the vehicle exceeds a prescribed threshold, e.g., exceeding a maximum hysteresis speed.

Thus an object of the present invention is to provide a fuel management control method for a hybrid electric vehicle drive having a transmission with gear settings, an internal combustion engine and an electric motor arranged in parallel such that both can propel the vehicle; the system including an electric motor driven fuel pump and a programmable microprocessor the method comprising the steps of monitoring vehicle speed; sensing braking pressure; shutting-off fuel flow to the gas engine in response to vehicle braking at predetermined vehicle speeds and gear settings and maintaining the fuel shut off during vehicle coasting while controlling the electric motor to provide either engine starting or regenerative braking depending upon the vehicle speed.

Another object of the invention is to provide an improved method of fuel control for a hybrid electric vehicle including a drive system with an internal combustion engine and an electric machine operated as an electric motor to electrically turn the engine so as to electrically creep start the vehicle without supply of fuel or spark to the internal combustion engine and as a generator to produce regenerative braking and wherein the electric motor is connected via a drive belt to the crankshaft of the engine and wherein fuel is cut-off in accordance with an aggressive fuel control algorithm responsive to brake pedal operation in a brake start speed range and in a hysteresis speed range and to a combination of gas pedal position and brake pedal position in speed ranges above the hysteresis speed range.

A feature of the present invention is to, if desired, provide a torque converter having a mechanical one-way clutch connected between the pump and turbine of the torque converter that free wheels in the input drive direction so that the engine can be started by the electric motor and wherein the one-way clutch locks to directly connect the torque converter turbine and impeller during any back drive produced during vehicle coasting to prevent engine stall.

A further feature of the present invention is to initiate such fuel control when the vehicle transmission is in a forward drive mode and decelerating.

A feature of the present invention is to initiate such fuel control when the vehicle transmission is in a forward drive mode and decelerating upon application of a brake pedal.

A feature of the present invention is to initiate such fuel control when the vehicle transmission is in a forward drive mode and decelerating upon release of an accelerator pedal.

Still another object of the present invention is to provide an improved method for operating a hybrid vehicle having an internal combustion engine; a torque converter with an impeller turbine connection through a forward drive free wheeling and reverse drive locking one-way clutch connection and an electric motor generator connected to the crankshaft of the internal combustion engine by a direct drive belt and controlling the electric motor to charge batteries during vehicle deceleration/coasting operation and providing an engine fuel controller and operating the controller to be responsive to vehicle operations causing coasting to provide an aggressive fuel flow cut-off while the torque converter is operative to synchronize overdrive of the vehicle during coasting with the engine speed to prevent the internal combustion engine from stalling upon fuel flow cut-off during such coasting operation.

Yet another feature of the invention is to provide a fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive and controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation.

A further advantage is that during decelerations from a regenerative braking speed range referred to as a Regen-Able speed range, the fuel flow can be cut off when the accelerator pedal is released, or when the brake pedal is depressed depending on the vehicle speed and gear setting. In this routine, as the vehicle continues to roll forward, the electric motor's polarity can be reversed to activate regenerative braking which helps decelerate the vehicle and recharge an associated battery pack. The torque converter clutch 105 or the locking clutch 34 is kept active in the Regen-Able speed range so as to keep the gas engine spinning so that the engine firing can be easily restored if the accelerator is depressed.

A still further advantage is provided by the fuel control and hybrid system of the present invention as the vehicle decelerates down to a low speed range (e.g., $\leq 10$ mph), hereinafter referred to as the "Hysteresis Mode". In this mode when the brake pedal is depressed when decelerating from a speed greater than the minimum Hysteresis speed, the fuel is cut off. However, in this mode, once driving in or below the Hysteresis speed range, the fuel is not cut off until the vehicle speed exceeds the maximum Hysteresis-range speed. This fuel control operation provides enhanced low-speed driveability.

A further feature is to provide such method of control in a hybrid vehicle gear having a multi-transmission and wherein in higher gear (e.g. $3^{rd}$ and $4^{th}$) and above a critical speed Vtps release of the gas pedal initiates an engine fuel-off sequence.

Another feature is to provide the preceding fuel control sequence including the step of providing a timer that delays the beginning of the fuel cutoff sequence.

Still another feature is to provide such timed control of fuel shutoff including shutting off fuel, one cylinder at a time to provide a smooth deceleration feel. For lower gears (e.g. $1^{st}$ and $2^{nd}$) and under a critical speed, fuel cutoff is initiated by the application of the brake pedal.

A still further feature is to provide such method of control where, at some high speed, if the fuel is shut off (by either release of gas pedal or application of brake), and the driver coasts with no pedal application, a reverse freewheel will back-drive the engine until some low engine RPM at which the compression pulses of the engine become objectionable; the transmission operative to drop to first gear (effectively neutral since the first gear has a freewheel). And wherein fuel and spark is delivered to the engine just before this drop-to-neutral point so as to not stall the engine; the drop-to-neutral point being calibrated as a function of deceleration rate.

A further feature is to provide the preceding method including the step of restarting a stalled engine from a no-pedal condition by applying the gas pedal.

A further method includes providing a micro processing program including a "hybrid-active speed" as the speed that the car needs to exceed for the hybrid system to become active (i.e. fuel cutoff enabled); and wherein a speed hysteresis is included in the hybrid-active speed having a hybrid-active speed for acceleration Va, and having another for deceleration Vd and wherein the quantification of acceleration/deceleration determined by whether the driver has applied the gas pedal just before the fuel-off command.

A further feature is a method in fuel control in an HEV by providing a brake start routine at gas engine start-up can be activated from vehicle stop by the release of the brake pedal without requiring depression of the accelerator pedal; providing a brake pressure sensor and on a powertrain computer for tracking the pedal force, as well as the rate of pedal application and the rate of pedal release. Wherein from a full vehicle stop (or low-speed vehicle roll operation, with the engine stalled) upon release of the brake pedal, the engine and transmission is turned by the electric motor. A further feature is to provide such a method wherein a powertrain computer controls the engine acceleration and speed, and delivers fuel and spark based on engine speed, vehicle speed, throttle position, and intake manifold air pressure (MAP).

A further feature is to provide a method including determining if the engine temperature is above a prescribed threshold and controlling the starter such that the engine does not have to be re-cranked. When the ignition key is turned to run (but not all the way to crank) and PRNDL lever is shifted into drive (D) and the brake pedal is released, the electric motor operating creep the vehicle forward and start the engine as fuel flow commences.

Yet another feature is to provide such a method including monitoring engine temperature, road grade, and vehicle turning to adjust the calibration of the hybridization or the level of drive required from the electric motor and from the gasoline engine during such creep forward operation; wherein when the vehicle is cold, the fuel is not turned off and on to optimize fuel consumption since electric motor start only would constitute an unnecessary drain on the battery pack and wherein when the road grade is too great the fuel is not cut off, additionally, the fuel cutoff algorithm is readjusted when making hard turns (at speed) or tight turns (at low speeds) to enhance driveability.

DESCRIPTION OF PREFERRED EMBODIMENT

Figure 1:
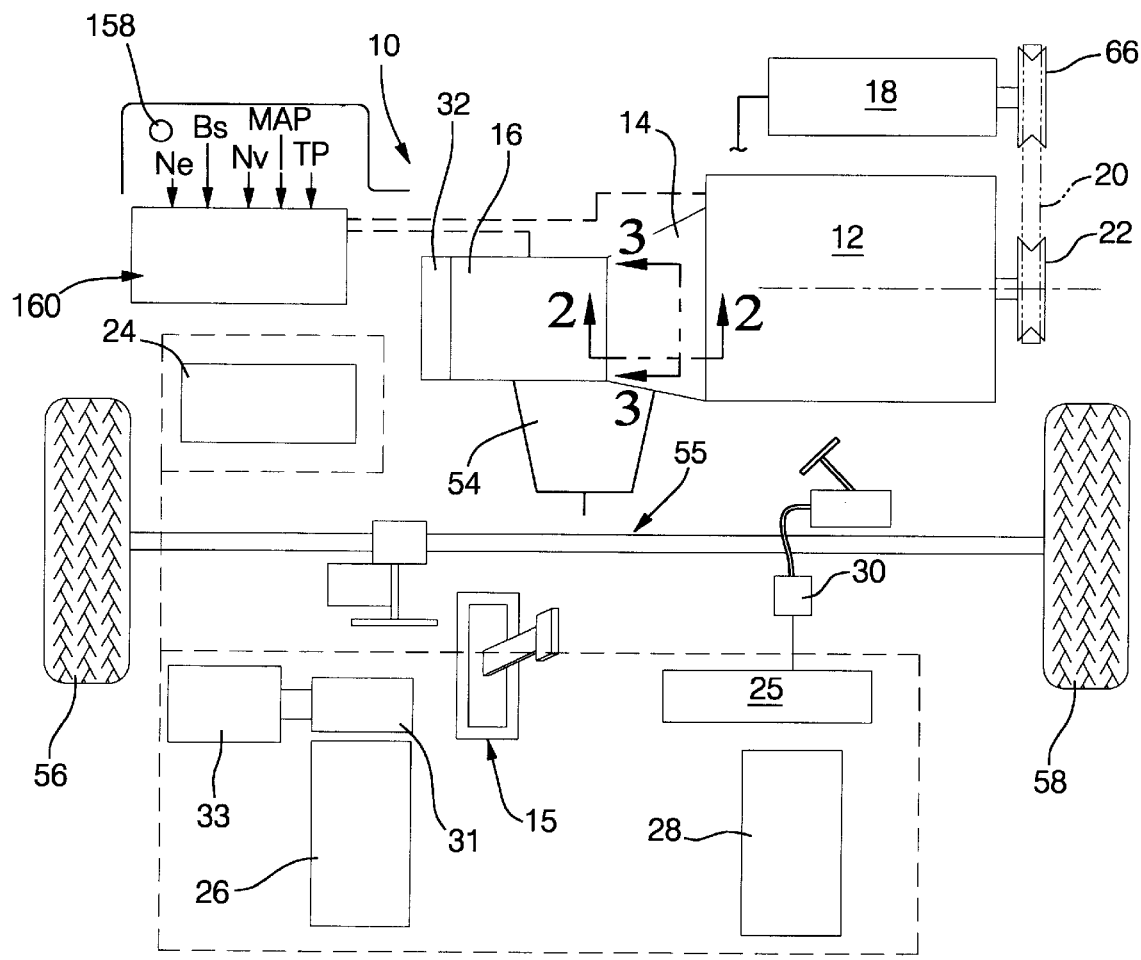
FIG. 1 is a diagrammatic view of a hybrid vehicle drive system including the present invention.

Our invention may be used in the environment described with reference to FIG. 1 for purposes of improving the fuel efficiency of a hybrid vehicle drive system 10 including a gas engine 12, a torque converter 14 and a multi-speed automatic transmission 16. The hybrid drive system 10 further includes a motor generator 18 connected to the front end of the engine by a direct belt drive 20 for providing a drive path to the crankshaft 22 of the engine. The motor generator 18 is operatively associated with a controller 25 for selectively operating the motor-generator 18 during start or to produce generated power for charging an array of batteries 24, 26 and 28. An engine controller 160 is associated with a brake-pressure sensor 30 that directs a signal to the motor-generator controller 25 regulating the motor generator 18 power. A suitable DCDC converter 31 is provided to direct higher voltage charging power from the motor generator 18 to a low voltage accessory system 33, during generator operation.

The invention includes an over-speed locking and forward speed freewheeling one-way clutch assembly 34 (best shown in FIGS. 2 and 3) operatively connected between the impeller or pump 36 of the torque converter 14 and the turbine 38 thereof for purposes to be described.

The transmission 16 includes known gear sets, clutches, brakes operative to provide a number of drive speed ratios between the engine 12 and a vehicle drive system 55 such as the illustrated differential 54 and drive wheel 56, 58 arrangement with it being understood that the drive wheels can be front or rear drive wheels and that the drive system can be modified to include various forms of power transfer to and from either front or rear drive wheels or both as desired. Multi-speed transmissions 16 are well known and as such a complete description thereof is not required for purposes of understanding the configuration and operation of the present invention.

Figure 4:
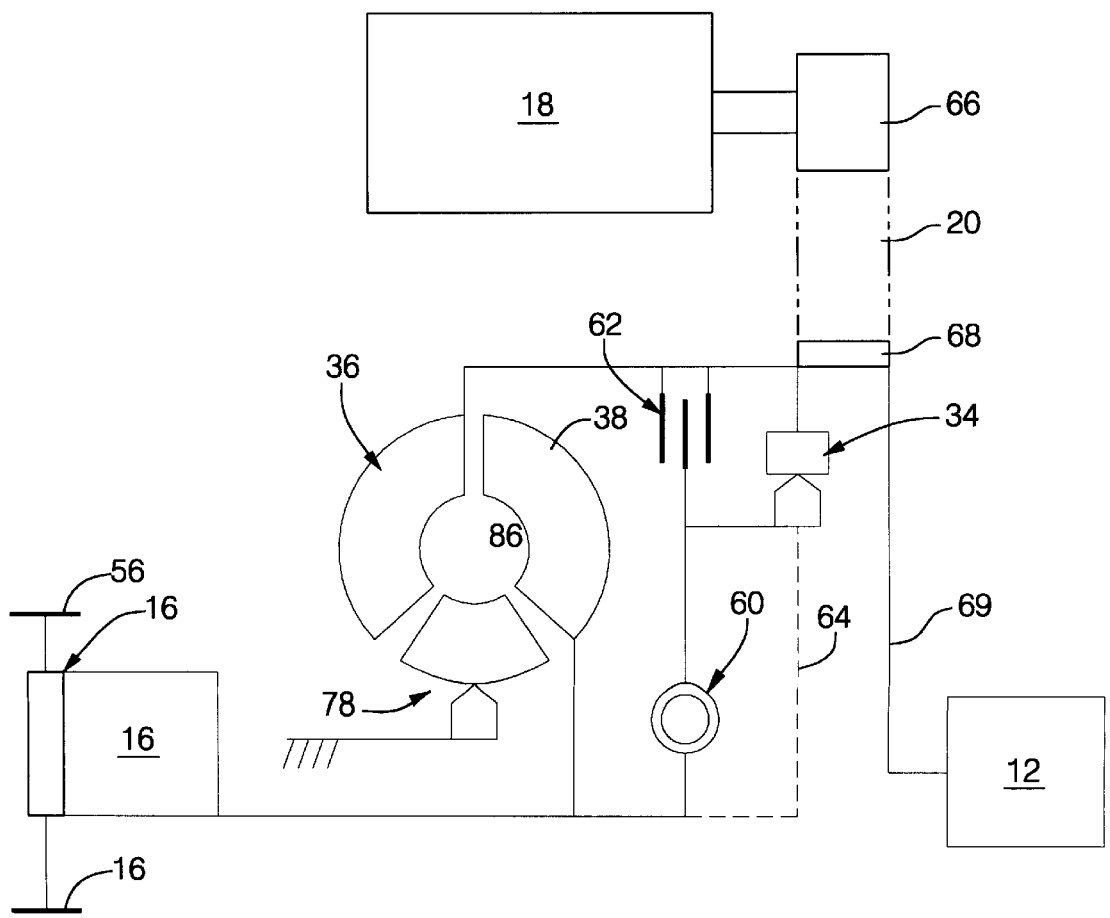
FIG. 4 is a line diagram of a torque converter and transmission for use in the drive system of FIG. 1.

Additionally, as diagrammatically shown in FIG. 4, the reverse lock, forward free wheel one-way clutch 34 is connected between the impeller 36 and the turbine 38 of the torque converter 14. Furthermore, in the preferred embodiment, the direct cross connection of the reverse lock; forward free wheel one-way clutch 34 can include connection to the spring damper assembly 60 for a lock-up clutch 62. The preferred connection is shown in solid line in the diagrammatic showing of FIG. 4 and the alternative direct connection is shown by broken line designated by reference numeral 64 in FIG. 4. Furthermore, as shown, the electric motor 18 is directly connected by belt 20 via a pulley 66 and a direct drive connection 68 directly to the crankshaft of the engine 12, diagrammatically designated by reference numeral 69 in FIG. 4. Hence, during direct forward drive by either conditioning the electric motor 18 to be a starting motor for the engine 12 or during direct forward drive by the engine 12, the one-way clutch 34 is operative to free wheel. However, because of the direct (or damper spring) connection between the impeller 36 and turbine 38 the reverse lock, forward free wheel one-way clutch 34 will lock-up during back drive from the transmission as in the case of vehicle deceleration or coasting while the gear selector is in a forward drive position so as to prevent engine speed droop or fall off.

Figure 2:
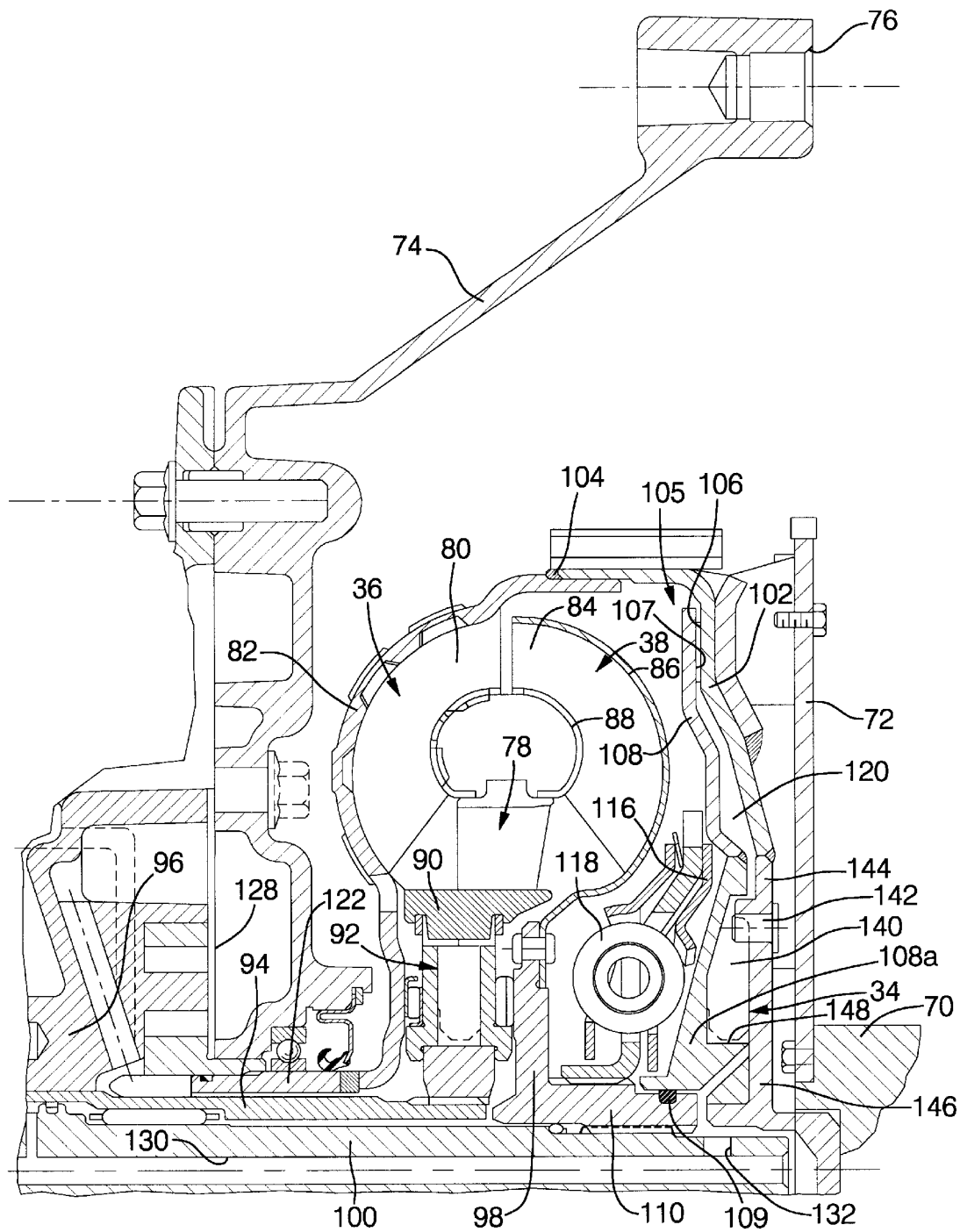
FIG. 2 is an enlarged fragmentary cross-sectional view taken along the line 2—2 of FIG. 1 looking in the direction of the arrows showing a sectional view of the modified torque converter of the present invention.
Figure 3:
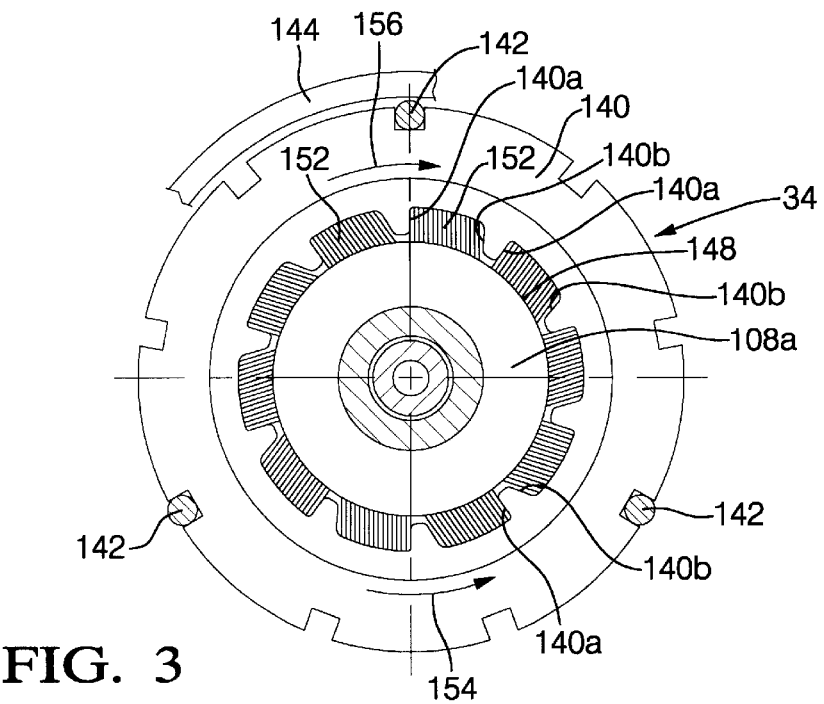
FIG. 3 is an enlarged fragmentary sectional view taken along the line 3—3 of FIG. 1 showing the component parts of a one-way clutch connected between the impeller and the turbine of the modified torque converter.

For a full understanding of the operation of the modified torque converter of the present invention further detail of the torque converter 14 is set forth in FIGS. 2 and 3. Numeral 70 in FIG. 2 designates the end of an engine crankshaft and numeral 72 designates a spring-damped flywheel of the hydrokinetic torque converter 14 that is mounted on the axis of the crankshaft. A torque converter housing 74 is adapted to be bolted to the engine housing at its margin 76.

Torque converter 14 includes the impeller 36, the turbine 38 and a bladed reactor 78. The impeller 36 has toroidal outflow blades 80 secured to the interior of an impeller housing 82. Turbine 38 has radial inflow blades 84 disposed between outer turbine shroud 86 and inner turbine shroud 88. Reactor 78 includes blades supported by reactor hub 90. They are situated between the flow exit section of the turbine 38 and the flow entrance section of the impeller 36. Reactor 78 includes an overrunning brake 92 in the hub 90, which accommodates one-way torque delivery to a stationary reactor sleeve shaft 94, the latter being connected to a support wall 96 which forms a part of the torque converter housing 74.

Turbine 38 has a turbine hub 98 to which the inner margin of the outer shroud 86 of the turbine 38 is secured. Turbine hub 98 is splined to the turbine sleeve shaft 100.

Sleeve shaft 100 transfers torque to the four speed automatic transmission, which is arranged on an axis parallel to the axis of the converter.

Numeral 102 designates the forward wall of the converter housing which is welded at its outer margin 104 to the impeller housing 82 and is associated with a known type torque converter lock-up clutch 105. The clutch 105 is defined by an annular friction surface 106 on the wall 102 at a radially outward location. That surface is adapted to be engaged by the friction surface 107 of a lock-up clutch piston plate 108. The inner margin 108a of the piston plate 108 is mounted on and sealed by an O-ring 109 on an extension of the turbine hub 98, shown at 110, and is adapted to move axially with respect to the turbine hub 98.

The spring damper assembly 60 includes a damper driven plate 112 splined at 114 to the turbine hub 98. A damper driving plate 116 is secured to a radially outward portion of the lock-up clutch piston plate 108. Damper springs 118 interposed between the plates 112, 116 establish a resilient connection between driving plate 116 and the driven plate 112. For an understanding of the general configuration and mode of operation of a damper of this general type, reference may be made to U.S. Pat. Nos. 2,574,573 and 4,304, 107 as well as previously mentioned U.S. Pat. No. 4,509, 389.

The clutch piston plate 108 is urged into engagement with the converter housing 102 by the circuit pressure in the torus circuit for the converter. When control pressure is supplied to the annular space or cavity 120 between the piston plate 108 and the wall 102 of the converter housing, fluid flow is passed across the friction surfaces of the converter housing and the piston plate, thereby releasing the clutch. The fluid that passes across the friction surfaces in a radially outward direction is added through the flow normally distributed through the torus circuit, and the combined flow then passes out from the torus circuit through the flow return passage.

A transmission pump drive shaft 122 is splined at 124 to an extension 126 on the outer shroud of the impeller 36. A control pump 128, as seen in FIG. 2, is adapted to be driven by drive shaft 122.

A control oil pressure distributor passage 130 is defined by the central opening of the shaft 96. Control oil pressure is distributed through passage 130 and through a radial passage 132 formed in the clutch cylinder member 78. Radial passage 132 communicates through a passage 133 in clutch plate piston 108 with the pressure chamber 120.

By controlling the pressure in the cavity 120, the engaging force of the friction surfaces 106, 107 can be controlled. The circuit pressure establishes a pressure force on the piston plate 108 to apply the clutch 105. The control pressure in the cavity 120 releases the clutch. The pressure ratio across the piston plate can be controlled to establish a continuous slipping of the clutch discs, thus reducing engine torsional disturbances and increasing the torque transmitting capacity and torque multiplication efficiency. A portion of the driving torque that is not distributed to the clutch disc is transmitted hydrokinetically through the converter to the turbine sleeve shaft 100.

The feature of the reverse locking and forward free wheeling one-way clutch assembly 34 connected between the impeller or pump 36 of the torque converter 14 and the turbine 38 provides a direct drive during operator selected multi-speed drive depending upon the position of a gear shifter 15 schematically shown in FIG. 1 and the response thereto within the transmission 16. As a consequence, the torque converter 14, in the forward direct drive operation, will provide a desired torque transfer operation until the drive speed of the transmission is synchronized to that of the gas engine 12. At this point a converter clutch actuator (not shown) is operative to release the pressure in the cavity 120 so as to cause the torus pressure to shift the piston 108 into a locked engagement with the front wall 102 of the torque converter 14. This will result in a direct drive (possibly some slip as applied and if desired during lock-up) between the impeller and turbine so that there will be direct torque transfer between the engine and the transmission.

When combined with an electric motor generator 18 having its rotor connected directly to the crankshaft of a vehicle such an arrangement can take advantage of back drive from the vehicle wheels to the engine as occurs during vehicle coasting operations to drive the engine crankshaft 69 to drive the rotor of the generator 18 during a regenerative phase of operation where the controller 25 conditions the motor generator 18 to direct charging current from the motor generator 18 to charge the batteries 24, 26, 28. During such coasting, in addition to using the vehicle momentum to recharge the batteries, it is desirable to cut-off fuel flow to the gas engine by use of an aggressive fuel control algorithm. Such operation, however, when using known torque converter designs is not optimal in that the fluid coupling action of the torque converter and/or slip in the lock-up clutch 62 can cause the engine speed to droop below the transmission coasting speed and when fuel is cut-off, the engine can stall. In such cases the battery charge produced during coasting and the battery charge required for the electric starter motor can result in a net energy loss. Hence, the advantage of a motor generator arrangement is not fully realized.

By use of the modified torque converter of the present invention including a one-way clutch 34 that immediately locks on sensing coasting (overdrive) conditions and one that is operative to directly connect the turbine 38 to the impeller 36 will result in a drive operation in which fuel can be aggressively cut-off without engine stall or without engine speed droop that must be brought up to speed through the torque converter before direct coupling can occur in a known manner by use of a torque converter lock-up clutch such as described herein.

In the case of the present invention, as shown in FIG. 3, the one-way clutch 34 includes an outer race 140 connected by circumferentially located pins 142 to the outer end 144 of a shaft bearing support 146. When reverse drive occurs, an inner race 148 defined by an annular shoulder in lower piston part 108a is connected by sprag elements 152 directly (without any slip) to the lock-up clutch piston plate 108 that in turn is directly connected through the spring damper assembly 60 to the turbine hub extension 110 that is splined to the output shaft from the torque converter. Hence reverse or back drive will pass to the inner race 148 that in such drive direction is locked by sprag clutch elements 152 at flat radial surfaces 140a on the outer race 140 of the one-way clutch. The outer race 140 also includes surfaces 140b inclined with respect to the surfaces 140a to cause the sprag elements to release to allow free-wheeling action between the outer race 140 and inner race 148 during forward drive shown by the arrow identified by reference numeral 154. In reverse drive shown by the arrow identified by reference numeral 156, the transmission will directly drive the engine crankshaft without any fluid coupling slip at the torque converter. Hence, the objective of battery regeneration during vehicle coasting is possible since the electric motor/generator 18 is directly connected (always) to the crankshaft 69 of the engine. At the same time fuel flow to the engine can be terminated. When the gas pedal/throttle position is zero or a braking signal is directed from the braking sensor 30 to the controller and processed by a fuel management methods to be described. Hence, the objective of reduced fuel consumption is possible since anytime braking/coasting operations are sensed fuel flow to the engine can be terminated. The net result is full use of vehicle momentum for regeneration and full termination of fuel consumption during all vehicle coasting.

The present invention, in addition to the motor generator controller 25, the power train controller has an engine controller that includes a dash board or control panel indicator such as a light or a chime indicative of the hybrid system being active as shown by reference numeral 158 in FIG. 1. The power train controller includes an engine control microprocessor 160 that is inputted with engine output speed $N_e$, vehicle speed $N_v$, intake manifold air pressure MAP, throttle position TP and brake sensor signal and is programmed in response to such signals to deliver fuel and engine spark to control engine acceleration and speed.

Figure 8:
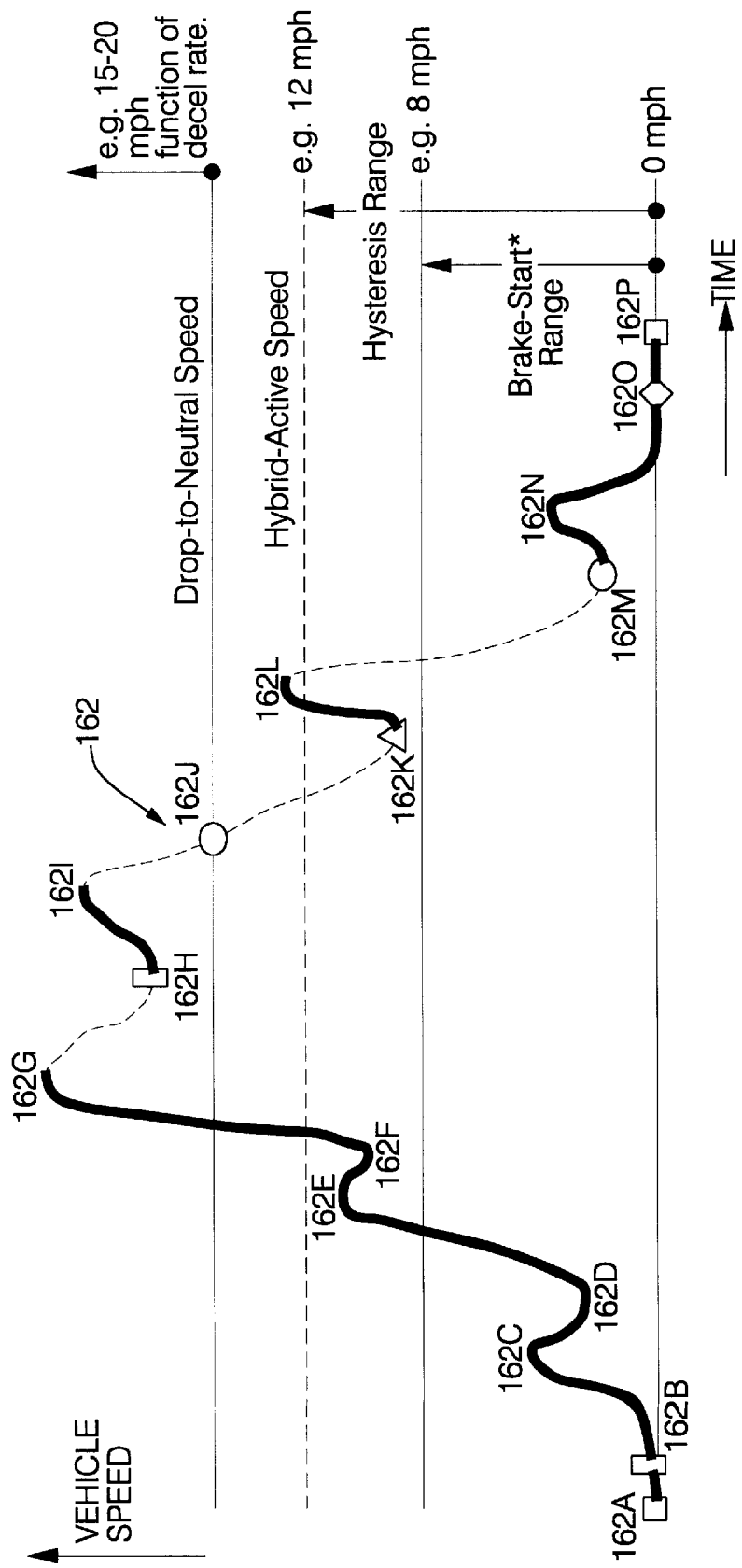
FIG. 8 is a schematic of the fuel control sequence of the program in FIGS. 5–7 as a function of vehicle speed.

A graphic representation of the control modes of the present invention is shown in FIG. 8 as including representative points on a vehicle speed time curve designated by reference numeral 162. At the beginning of the representatively illustrated schematic of one fuel control sequence obtainable with the fuel control algorithm of the present invention, the vehicle speed is zero at point 162A on the curve 162. At this point the vehicle is at rest and the fuel is off and when the brake pedal is released the electric motor 18 will be conditioned by the controller 25 to draw electrical energy from the battery pack 24–28 so as to cause the engine 12 to turn and thus drive the crankshaft of the vehicle and the connected drive train components including the torque converter clutch 105 and the multi-speed transmission 16 through a creep speed range shown between points 162A and 162B. During this operation that can be initiated merely by releasing the brake.

The vehicle speed increases due to an electrical creep drive from point 162A–162B. From 162B to 162C fuel and spark are delivered to start the engine. During this mode throttle application overrides the PID control of the electric motor as well as brake application. Fuel and spark continued to be delivered to the engine between points 162B, 162C; 162C, 162D; 162D, 162E; 162E, 162F; and 162F and 162G. During this time period the vehicle accelerates to a point above a hybrid-active speed. For example, 12 miles per hour through a brake-start speed range from zero miles per hour to 8 miles per hour. In order to start the engine after its fuel has been cut off and a regenerative braking operation, the engine can be restarted by delivering fuel and spark thereto at 162H. And if the engine RPM is lower than an operable level, the control for the generator or electric motor can be operated so as to help start the engine by use of the electric motor 18.

Once the engine is started, between points 162H and 162I fuel is maintained on. As shown between point 162I and 162J, fuel can be controlled off and a brake regeneration operation can occur. At point 162J, the vehicle operation is such that the transmission drops to its first gear range and the first gear's forward-locking over-run clutch is operative to produce drive train operation equivalent to operation in neutral.

In order to further conserve fuel, between points 162J and 162K the fuel is maintained off and the vehicle can coast with the engine stalled.

Once the vehicle decelerates below the predetermined hybrid active speed, in order to restart the gasoline engine with the electric motor the brake pedal is released or gas pedal is depressed (if the brake had not been depressed) and fuel is maintained on between points 162K and 162L. The fuel off coast mode can reoccur between points 162L and 162M. At point 162M the vehicle speed is low "slightly above zero miles per hour" and when the brake is released the electric motor will be operated to start the engine with fuel being maintained on between points 162M and 162N; 162N and 162O.

At point 162O, the vehicle is stopped with engine idling and fuel on. At this point fuel can be shut off by bottoming out the brake pedal, so that between point 162O and 162P the vehicle is subject to a fuel off stop. At point 162P equivalent to point 162A the vehicle can be restarted electrically by release of the brake pedal. In accordance with certain aspects of the invention the number of electrical restarts that are allowable without exceeding the active speed so as to be able to produce regenerative braking action, is limited to a number that will sustain a battery state of charge required for vehicle operation.

Figure 5:
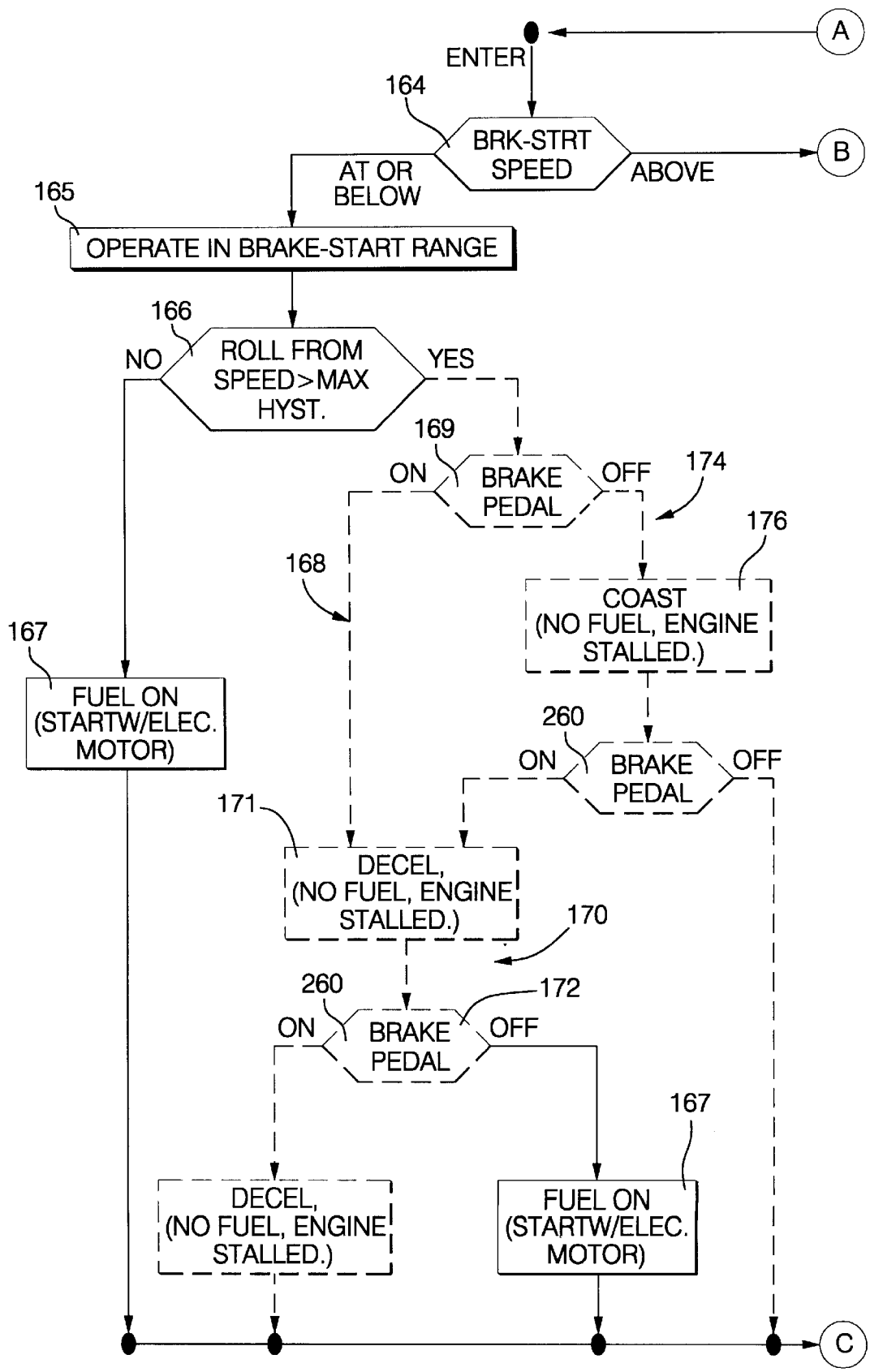
FIGS. 5–7 are flowcharts of a program for operating a fuel control of a hybrid electric vehicle.

Referring to FIG. 5, a flow chart of a program for controlling fuel flow is shown. Fuel on engine states are shown by solid lines and fuel off engine states are shown in broken line. At or below the brake start speed determined at decision point 164, one fuel control program of the present invention enters an operate in brake-start range mode at 165. A determination of roll speed is made of vehicle speed $N_v$ and the microprocessor is programmed at start control decision point 166 if the roll speed is less than the maximum hysteresis speed (shown at hybrid-active speed in FIG. 8) to produce a fuel on control and a start with the electric motor 18 designated by reference numeral 167. The maximum hysteresis speed is shown as being 12 mph in the chart of FIG. 8.

The roll from start speed is rechecked periodically until the vehicle speed exceeds the maximum hysteresis speed at which point the brake start range of fuel control operation enters a subroutine designated by reference numeral 168 in FIG. 5 that is operative in response to brake pedal operation as sensed by the brake sensor 30. The brake pedal operates the sensor 30 to direct a signal of pedal force and acceleration and signal of pedal release and acceleration B, to the engine microprocessor 160. As shown at decision point 169 when the brake pedal is depressed to produce a brake on signal from the brake sensor the microprocessor is programmed to initiate a subroutine 170 that includes a deceleration mode control with no fuel flow to the engine and engine stalled as shown at 171. The program will recheck brake pedal signal periodically and as shown at 172, if the brake pedal remains off the mode control 171 remains in effect.

Alternatively the brake start mode of control includes a subroutine 174 initiated when the roll speed exceeds the maximum hysteresis speed and the brake pedal is off. During this subroutine, the engine is operable in a coast mode in which no engine fuel is supplied and the engine 12 is stalled shown at 176. In the subroutine 174 the microprocessor is programmed to periodically check if the pressure signal from the brake switch indicates that the brake pedal remains off; if there is no brake on signal, fuel cut-off remains in effect. If the brake pedal is applied to produce a brake on signal, the sub-routine 174 re-enters the deceleration control mode at 170 and the brake pressure is rechecked as previously described.

Referring back to the chart of FIG. 8, points 162E–162F and 162K show operation of the vehicle in a hysteresis speed range, e.g., from 0 mph to 12 mph. At points 162E and 162F the fuel is on under the control of a fuel control routine shown in FIG. 6 as will be described. At control point 162k the control of the present invention is operative to start the engine with the electric motor upon tip into gas pedal, that occurs as the vehicle decelerates and the driver wants to increase speed and the gas pedal is depressed to supply fuel to the engine. The fuel control overrides any prior brake signal causing fuel shut off in cases where a driver applies both brake and gas pedal.

Figure 6:
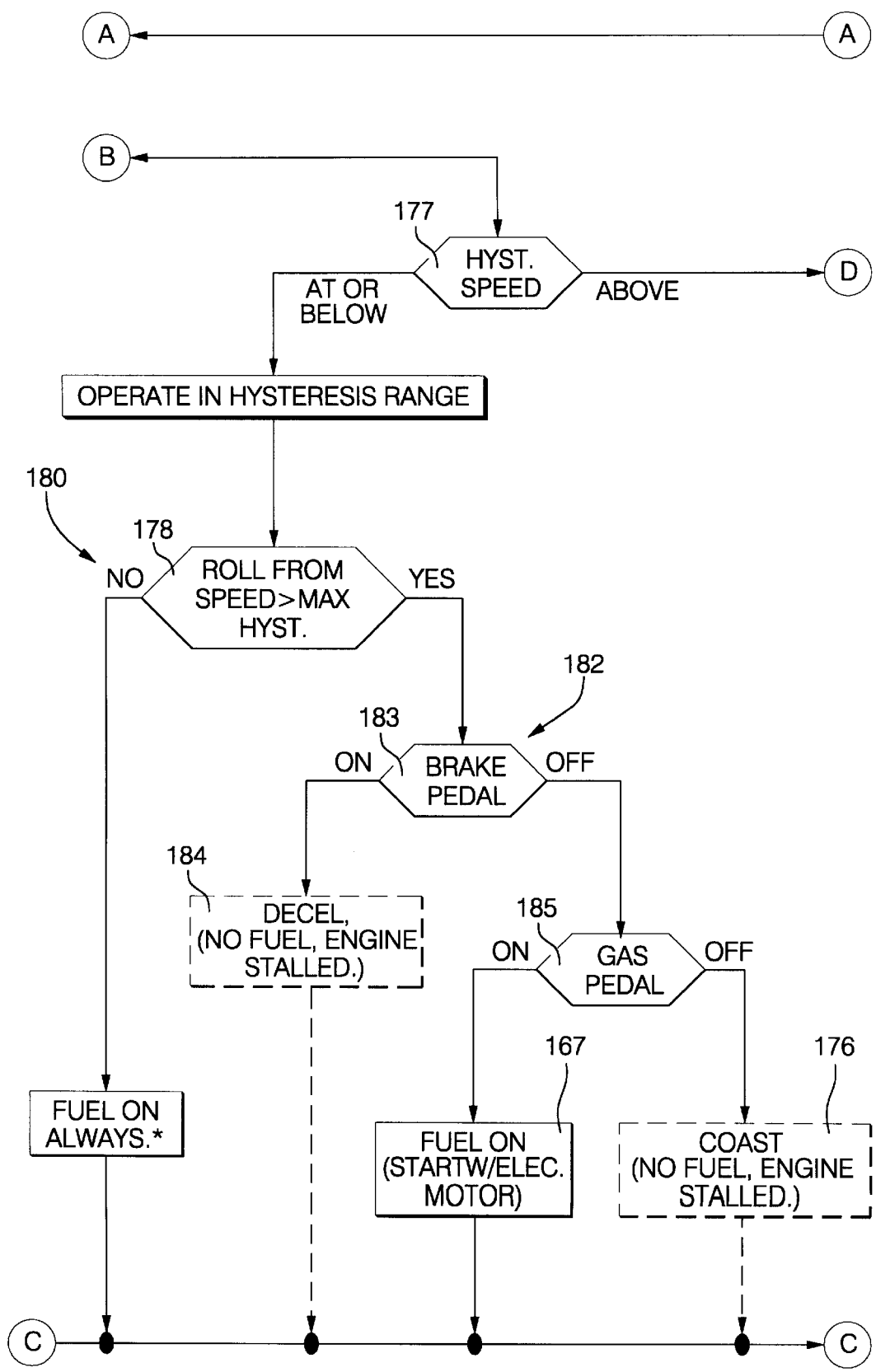

More particularly, as shown in FIG. 6, when the vehicle is operating at or below the maximum hysteresis speed as determined by sensing the vehicle speed and as designated by reference numeral 177, the vehicle speed signal to the microprocessor is operated with a program that includes a routine that determines that the vehicle is operating above the brake start speed range and that it is operating at or below the maximum hysteresis speed. A determination is made that the roll from stop speed is less than the maximum hysteresis speed at decision point designated by reference numeral 178 to enter a subroutine 180 in which the fuel is always on. Such operation assures that the engine will not stall. Furthermore, at a zero-speed engine idle operation, the fuel flow is cut off when the brake pedal is bottomed out producing a brake pressure signal $P_{critical}$. But during a non-zero-speed engine speed and a brake apply operation, the engine firing is resumed if the critical brake-vacuum level is exceeded.

If the vehicle speed signal to the microprocessor is greater than the maximum hysteresis speed, e.g. points 162I, 162J and 162L in FIG. 8, the fuel control algorithm enters a subroutine 182 that includes checking brake pedal operation and as designated by reference numeral 183 a determination is made either that the brake pedal switch signal indicates the brake is on or off. If the brake pedal switch generates an on signal, the fuel is cut-off and the vehicle decelerates with the engine designated by reference numeral 184. If the brake pedal switch generates an off signal, a gas pedal switch signal is processed by the fuel control program at a decision point designated by reference numeral 184 in FIG. 6. If the gas pedal is depressed a signal is generated such that the microprocessor produces an output for producing fuel on and a start with electric motor operation, (same as previous control mode designated by reference numeral 167 in FIG. 5) such control is shown at 162K in FIG. 8. If the gas pedal is released an off signal is generated and the microprocessor program generates a fuel off signal and the vehicle coasts with no fuel and the engine stalled, same operation as designated by reference numeral 176 in FIG. 5.

Referring to the chart of FIG. 8, points 162G–162H and 162I–162J, include various operating modes in the regen-able speed range e.g., 16 mph, and a function of the deceleration rate. In this range of vehicle operation, either the torque converter clutch 105 is locked or the torque converter reverse-free wheel clutch 34 is active, e.g., is driven by the transmission to directly connect the turbine and impeller of the torque converter 14 upon reverse drive thereto. When vehicle operation is in the regen-able vehicle speed, as shown between 162G and 162H the microprocessor is programmed to cut off the fuel supply to the engine 12 in response to brake and/or gas pedal operation. At the same time, the controller 25 can be conditioned to cause the motor generator 18 to be operated as a generator driven by the crankshaft of the engine 12 to produce a charging current for the battery pack 24–28. At speed point 162H the engine can be started by delivery of fuel and spark thereto and if the engine rpm is lower than optimal the electric motor 18 can be driven to provide further parallel drive to the drive train of the vehicle. In this range of operation, when the engine is started, vehicle speed increases as shown between points 162H and 162I and the microprocessor is programmed to control fuel on. When the speed of the vehicle falls from points 162I to 162J, the fuel remains off as the speed of the vehicle falls to a drop-to-neutral, e.g., the transmission drops to first gear and the transmission cannot back drive the engine. If the fuel remains off the vehicle speed continues to drop to a lower speed in the hysteresis range at which point the engine is stalled and the electric motor can be operated to start the engine as previously discussed.

Figure 7:
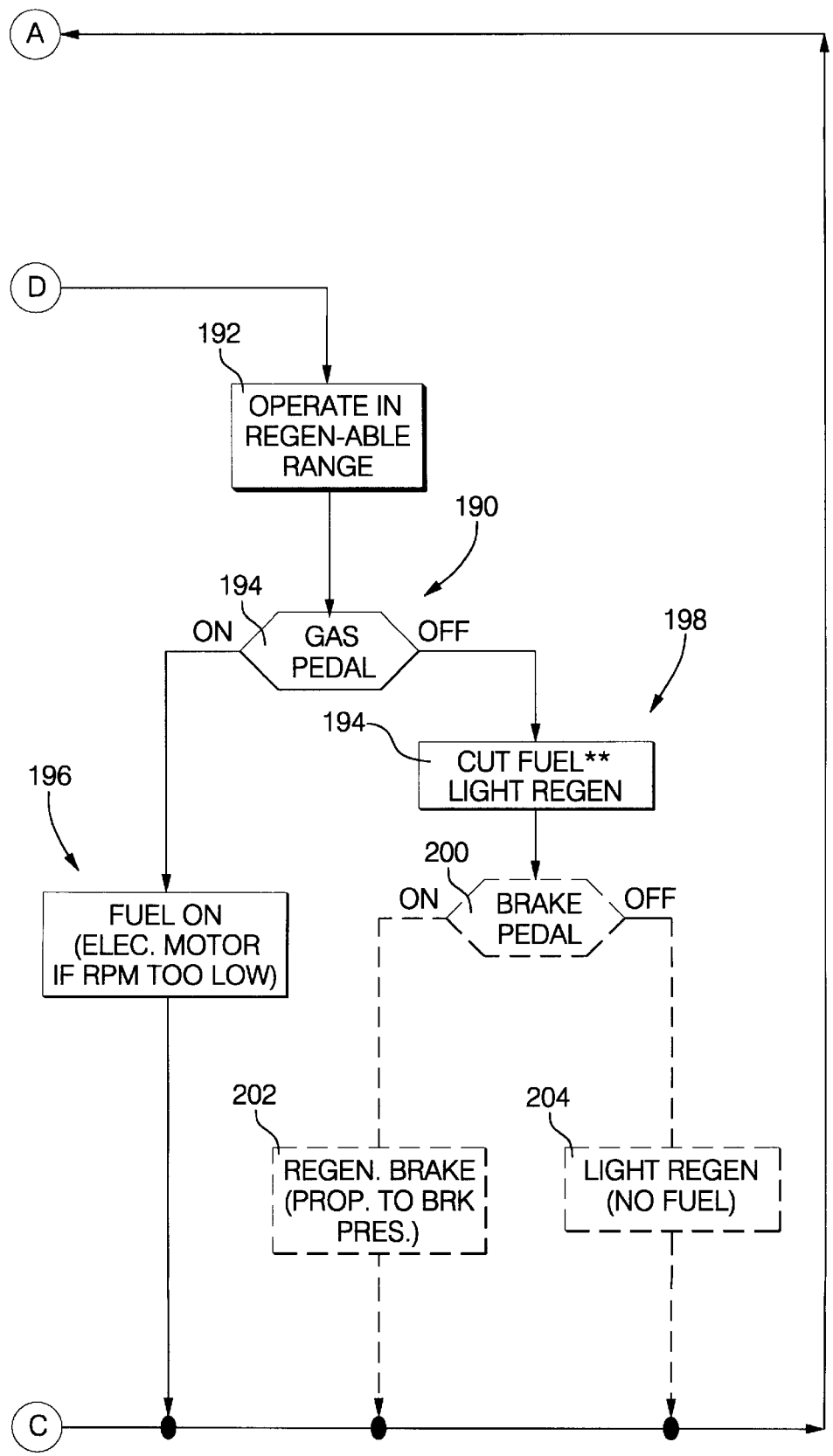

More particularly as shown, in FIG. 7, when the vehicle is operating in a speed range wherein the electric motor 18 can be operated to produce regenerative braking for charging the battery pack 24–28, shown by points 162G–162H, and 162I–162J, the vehicle speed signal to the microprocessor 160 is operated with a program that includes a routine that determines that the vehicle is operating in a speed range that for example exceeds 16 mph, a range that is also dependent upon the deceleration rate of a vehicle, in other words, the controllers for the electric motor and the engine fuel are operative to produce regenerative braking when there is sufficient vehicle momentum for operating the electric motor 18 as a generator without excessive vehicle braking. More particularly, the flow chart of FIG. 7 includes a fuel control routine 190 for conversing fuel. Vehicle speed is determined to be above the hysteresis speed range. At a decision point 192 the routine 190 is operative when vehicle speed signal to the microprocessor is above the maximum hysteresis speed. At this point regenerative braking is dependent upon the gas pedal position as represented at decision point 194. If the gas pedal is on, i.e., depressed, a subroutine 196 is initiated wherein the microprocessor will produce a fuel on signal for directing fuel from a fuel supply source (in one operating system a electric motor drive fuel pump connected to a electronically controlled fuel injector) to the gas engine 12. If the rpm of the engine is too low the electric motor 18 can be conditioned by its controller 25 to draw current from the battery pack 24–28 to provide supplemental drive power, generally to raise the engine RPM up to a level for smooth refire of the engine.

In the control routine 190, if the gas pedal is released (pedal off at decision point a subroutine 198 is provided that includes microprocessor programming that will produce an output signal for cutting the fuel flow off (an optional routine only cuts fuel flow when the brake pedal is also depressed to produce a braking signal and gas pedal release signal input to the microprocessor). In the illustrated subroutine 198, brake pedal pressure is periodically checked as designated by reference numeral 200. If the brake pedal is depressed to produce an on signal the microprocessor program and the controller are operative to produce regenerative braking by the electric motor 18 that is directly proportional to the brake pressure build-up, designated by reference numeral 202. In order to obtain such control, the aforesaid system includes a brake pedal equipped with a brake pressure sensor so that the engine computer can track the brake pressure, as well as the rate of pedal application and release. If the brake pedal is depressed at a faster rate, greater regenerative braking occurs and if it is depressed at a lesser rate, lesser regenerative braking occurs.

If the brake pedal is released at decision point 200, the microprocessor program is operative to condition the controller 25 to produce a reduced regenerative braking as designated by reference numeral 204 in subroutine 198.

While the fuel control method of the present invention is shown in association with a gasoline engine it is also suitable for use with other internal combustion engines including natural gas fueled engines and diesel fuel engines. Furthermore, while the fuel control method is optimized by use of a torque converter having a freewheeling-reverse lock clutch connected directly between its impeller and turbine, the connection of a supplemental electric motor to the crankshaft and its operation either as a start motor or a generator within the engine deceleration stop and start program outlined herein is useful in obtaining better fuel efficiency with it being understood that the optimal efficiency is made possible by the use of a torque converter having the free-wheeling, reverse lock clutch configuration set-forth in copending U.S. Ser. No. 09/483,987, office file H204481.

Figure 9:
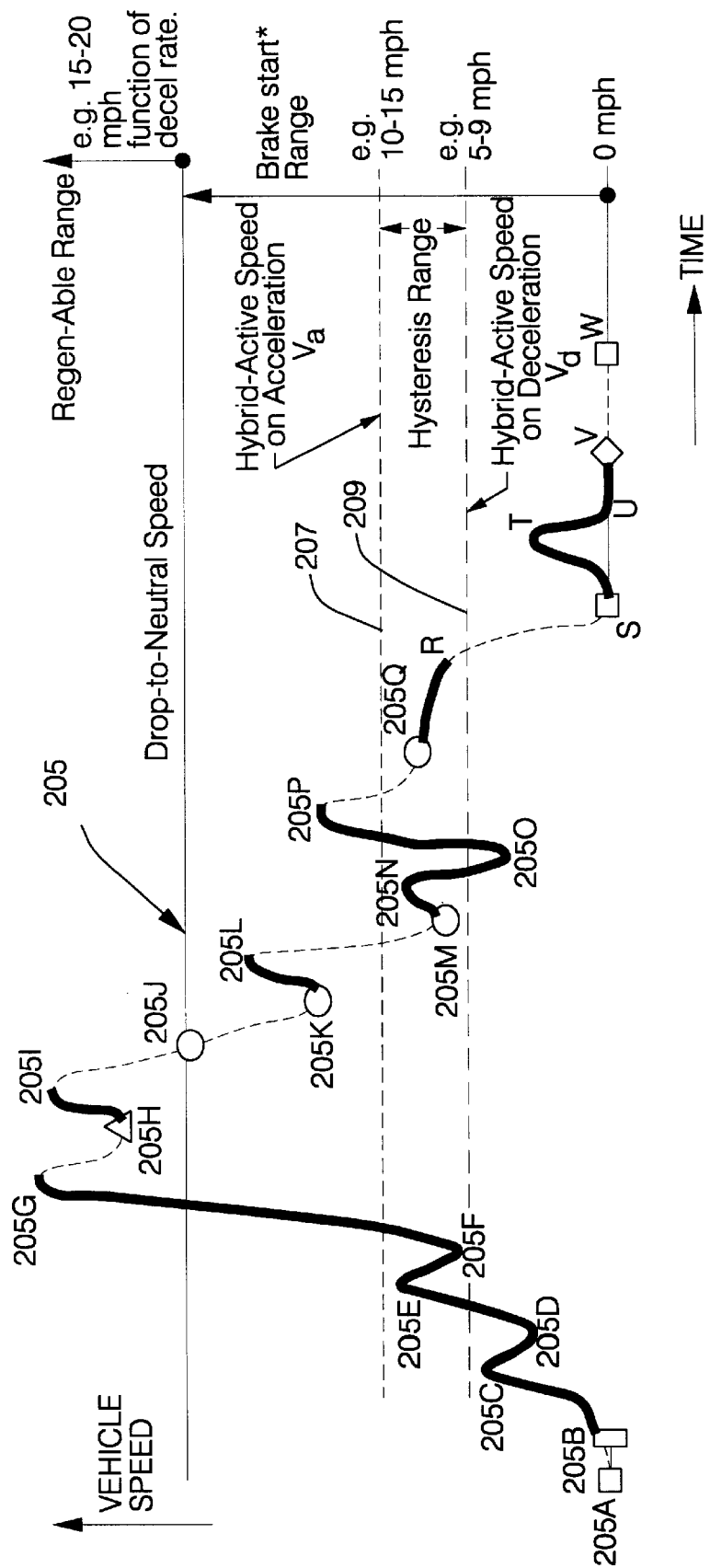
FIG. 9 is a schematic of a fuel control sequence of another embodiment of the invention.

A schematic of another and preferred fuel control sequences is a function of vehicle speed is shown in FIG. 9. It shows a hysteresis speed range that includes a hybrid-active speed initiation range on acceleration shown on broken line at 207 (e.g., a range of 10 to 15 miles per hou)r. A hybrid-active speed on deceleration at speed range(e.g., of 5 to 9 miles per hour) is shown by broken line 209 in FIG. 9. The control sequence in FIG. 9 also includes a brake start speed range that is between zero miles per hour and a speed above the hybrid- active speed on acceleration (shown by arrow 205 in FIG. 9).

The drop-to-neutral speed in the control sequence of FIG. 9 can be in the range of 15 to 20 miles per hour and is a function of deceleration rate as will be described. The regen-able speed range covers vehicle speeds above the drop-to-neutral speed.

Thus, in the embodiment, of FIG. 9, at 205A, the vehicle is at stop with the fuel off and as in the FIG. 8 embodiment, the brake is released to electrically turn the engine. The electric motor 18 creep drives the vehicle to point 205B where fuel and spark are delivered to start the engine. As in the previous embodiments, fuel flow is provided between point 205B and 205G. At the speed range of 205G to 205H the fuel-off regenerative operation discussed in the fuel control sequence of FIG. 8 is maintained.

At point 205H, when the gas pedal is depressed the engine is started by delivering fuel and spark and the electric motor 18 helps start the engine if the engine RPM is lower than an optimal level.

Fuel is maintained on as the vehicle accelerates between points 205H and 205I. If the vehicle is braked at this point, fuel will be shut off and a control sequence will be operated to cause the electric motor 18 to enter a regenerative braking phase of operation.

As the vehicle continues to decelerate to point 205J, the transmission is controlled to drop-to-neutral e.g. drop to its first gear range and the vehicle coasts off the first gear's forward-locking overrun clutch.

The fuel will remain off as the vehicle so coasts, the fuel will remain off between points 205J and 205K with the engine stalled. In order to start the engine during this phase with the electric motor 18, the brake is released. Fuel will remain on between points 205K and 205L so that the vehicle can accelerate; between points 205L and 205M fuel is maintained off as the vehicle coasts down in speed with the engine stalled. Again if desired, in order to accelerate the engine can be started with the electric motor on release of the brake. From points 205M through 205P fuel is maintained on. If the brake is reapplied the fuel will be off between points 205P to 205Q and the vehicle will coast with the engine stalled. At 205Q the engine can be started by the electric motor 18 upon release of the brake.

Fuel can remain on during the decrease of speed from 205Q to 205R with no application of the gas pedal, while the vehicle continues to decelerate.

Between points 205R and 205S fuel is shut off upon brake application and the vehicle continues to coast with the engine stalled as it decelerates to a stop at point 205S. At this point, with the fuel off, a release of the brake will electrically turn the engine and an immediate application of the gas pedal will command fuel delivery to the engine.

Between points 205S to 205V fuel is maintained on. At point 205V at stop with the engine idling with the fuel on, the fuel can be shut off by bottoming out the brake pedal so that there will be a full fuel off stop between points 205V and 205W.

As in the case of the first embodiment the vehicle can be restarted electrically by release of the brake pedal.

Figure 10A:
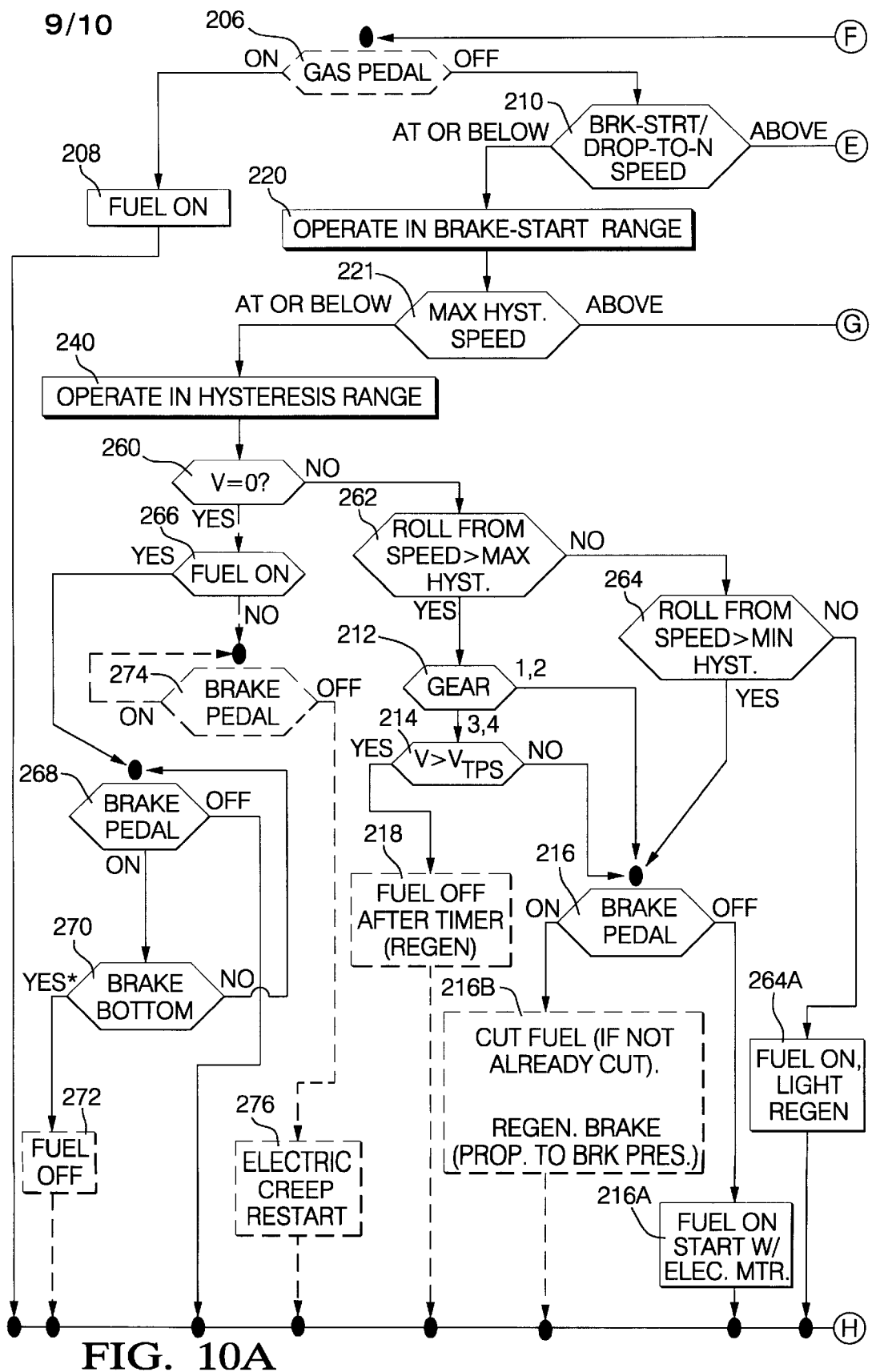
FIGS. 10A and 10B show a flow chart of a program for operating the embodiment shown in FIG. 9.
Figure 10B:
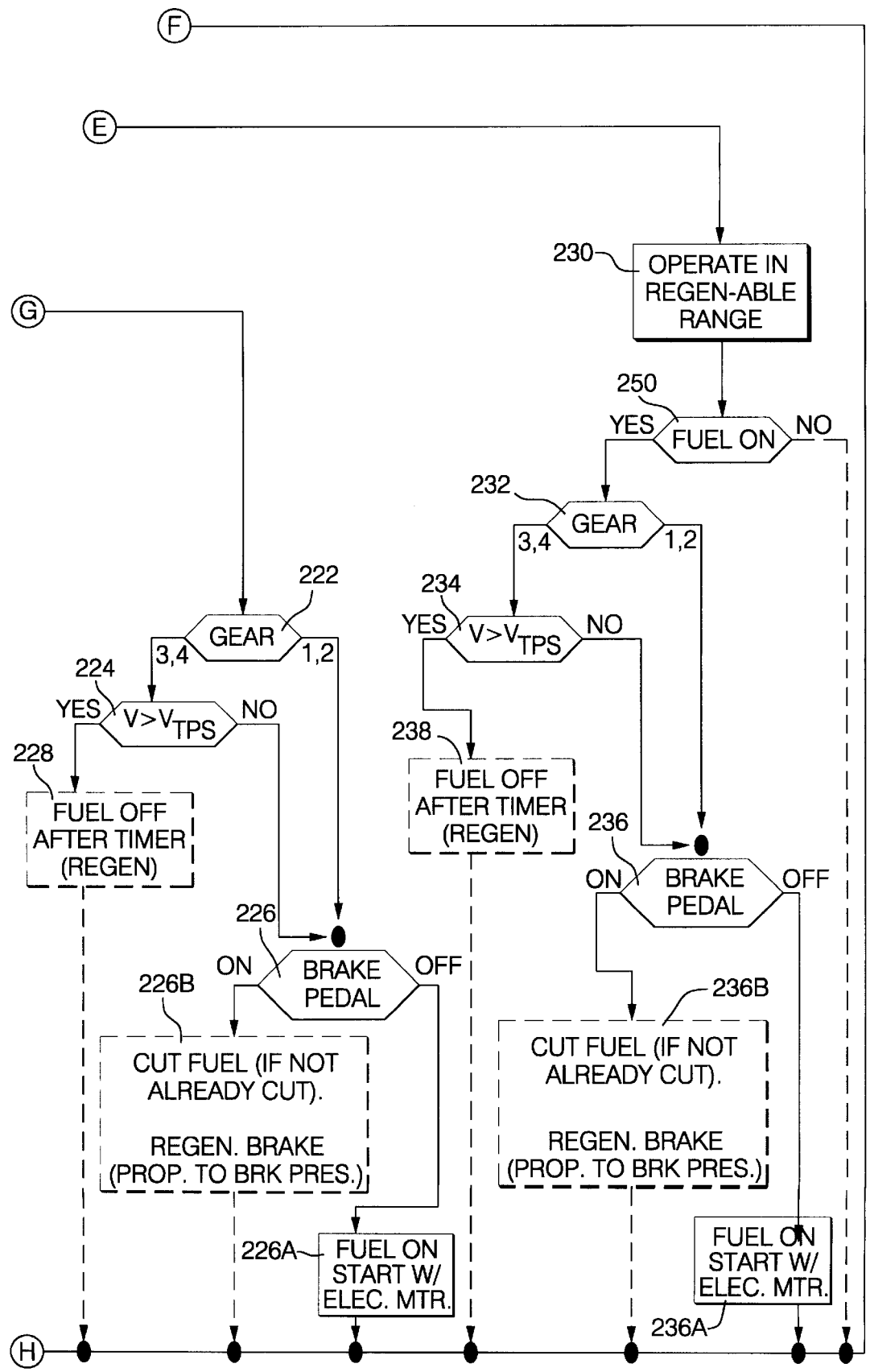

The preferred embodiment of the invention, includes a flow-chart of a modified control as illustrated in FIG. 10. It includes an operate in brake start range 220 and an operate in regen-able range 230 and an operate in hysteresis range 240.

FIG. 10 shows fuel on engine states in solid line and fuel off engine states in broken line. As in the previous embodiment, fuel cut off in the various road speed states is initiated by brake pedal operation and or operation of a gas pedal.

The controls program is initiated by the gas pedal position at decision point 206. When the gas pedal is on the vehicle engine will be supplied with fuel as shown at 208.

When the gas pedal is off, a determination is made (decision block 210) as to whether or not the brake start speed is above or below drop-to-neutral speed corresponding to operation of the vehicle drive train at a speed where the transmission is in first gear and the freewheeling clutch 34 is engaged. If the speed is at or below the drop-to-neutral speed, the control sequence enters the operate in brake start speed range 220.

The control sequence enters an operate in hysteresis speed range 240 of the vehicle speed is determined (at decision point 221) to be at or below a maximum hysteresis speed $V_a$ shown in FIG. 9. If the vehicle speed is above the drop-to-neutral, the vehicle will operate in the regen-able speed range at 230.

Another aspect of the invention is that speeds above each of the speed ranges, 220 230, and 240 when the multi speed transmission 16 is set in a higher gear range and the vehicle is operating above a critical speed, for example, 25 mile per hour, release of the gas pedal can initiate an engine fuel off sequence. A timer delays the beginning of the fuel cut off sequence. The system is operative to shut off fuel flow to one cylinder at a time in the engine 12 to provide a smooth deceleration feel.

At lower gear settings first and second and at a speed under the critical speed, fuel cut off is initiated by the application of the brake pedal as shown in FIG. 10.

The determination of whether the initiation of fuel cut off is by brake application or gas pedal operation is shown at flow-chart gear conditional boxes 212, 222, and 232 and at critical velocity conditional boxes 214, 224 and 234 respectively. The brake pedal termination of fuel is shown at conditional boxes 216, 226 and 236. The gas pedal termination of the fuel under each of the operating speed ranges is shown at conditional boxes 218, 228 and 238.

In each case, if the brake pedal is off fuel will remain on as shown at 216A, 226A and 236A, with the controller programmed to start the engine with electric motor 18 if stalled. If the brake pedal is depressed "on" fuel will be cut off as shown at conditional boxes 216B, 226B and 236B. In each case the fuel will be cut if not already cut by operation of the gas pedal, and the system will be conditioned so that the electric motor 18 will provide regenerative braking and charging of the battery pack proportional to the brake pressure.

Under the operate and regen-able range 230 the decision points of gear setting, speed range and brake pedal operation are determined by monitoring fuel flow as indicated by conditional box 250. When the fuel is on, the aforedescribed sequence will occur; if the fuel is off such operation is by passed.

Additionally in the operating hysteresis speed range 240, a vehicle start mode includes monitoring the vehicle speed as shown at conditional box 260 on determining whether or not the vehicle velocity is equal to zero or greater than zero. If it is not zero, a determination is made at conditional box 262 as to whether or not the vehicle speed is greater than the maximum hysteresis speed. If it is not greater than the maximum hysteresis speed, a further determination is made at conditional box 264 as to whether or not the vehicle speed is greater than the minimum hysteresis speed. If not, the fuel remains on as shown at 264A with light regeneration taking place as in the previous described control sequences. If the roll from start speed is greater than the minimum hysteresis speed, the control mode will enter the brake pedal controlling subroutine as previously described at 216.

If the roll from speed is greater than the maximum hysteresis speed, the control sequence will enter the subroutine at 212 of the previously described control.

If the vehicle is operating in the hysteresis range 240 at a zero velocity state, determination at the conditional box 266 establishes whether the fuel is on or off. If the fuel is on, a subroutine is entered in which the brake pedal position is determined as shown at conditional box 268. If the brake pedal is off, the control sequence is re-entered. If brake pedal is on, a determination is made at conditional box 270 whether the brake pedal is bottomed. If yes, the fuel is turned off at 272. If no, the brake pedal position is rechecked. However, if during a non-zero speed brake application engine firing is resumed and if the critical brake vacuum level is exceeded.

If fuel is not on during this operating mode, the brake pedal position is checked at conditional box 274. If the brake pedal is released, the system is conditioned to cause the electric motor 18 to produce a electric creep restart at 276 which corresponds to the previously illustrated start sequences at point 162A and point 205A in the embodiment of FIG. 8 and FIG. 9, respectively. In the case of brake bottoming being sensed at 270, if the brake pressure sensor signals that the brake pedal is bottom at a zero speed idle condition the fuel flow is cut off.

As shown in FIG. 10, the hybrid-active speed is the speed that the car needs to exceed for hybrid system to be come active so that fuel cut off can be enabled. The illustrated embodiment has a speed hysteresis designed into the hybrid-active speed. Thus there is a hybrid active speed for acceleration Va and another for deceleration Vd. The quantification of acceleration/deceleration is determined by whether the driver had applied the gas pedal just before the fuel off command. An example of this operation occurs if the vehicle accelerates from a stop, the vehicle must exceed Va (e.g. 10 miles per hour) as shown in FIG. 9 in order for the fuel cut off to be enabled. That is, when driving from a stop to nine miles per hour, there is no fuel shut off with brake application. But once the 10 mile per hour level is exceeded, the application of the brake pedal will initiate fuel cut off as shown in the flow-chart control of FIG. 10. This is also graphically illustrated in FIG. 9 at point 205D through 205H or points 205M through 205Q. As previously described, the exception to this rule is, if a driver bottoms out the brake pedal at a full stop. Also given a value of Va during acceleration, the Vd during the following deceleration is set to a lower speed (hysteresis). If the vehicle is decelerating with fuel off with a brake pedal applied, and the driver releases the brake pedal below the drop to neutral speed, the engine will start by conditioning the electric motor. After this brake start the driver may want to decelerate again and reapply the brake pedal. The minimum speed at which the driver can cut fuel by the brake pedal is a deceleration hybrid active speed Vd (or the lower hybrid-active speed).

The hysteresis band is implemented for driveability and improved fuel economy. As an example, suppose Va=10 mph and Vd=7 mph. The driver accelerates from 0 mph to 9 mph on gas power and applies the brakes. The engine will continue to fuel. However, if the driver accelerates from 0 mph to 11 mph and applies the brake pedal, the fuel is cut (Points 205 D-E-F-G-H or 205 M-N-O-P-Q in FIG. 9). If the driver decelerates from 10 mph with fuel off, with brakes applied, and releases the brake at some speed under the drop-to-neutral speed, the engine will restart (Point 205 Q).

If the driver reapplies the brake pedal at 8 mph (above Vd), the fuel will be cut (Point 205 R). However, if the driver had reapplied the brake pedal at 6 mph (below Vd), the fuel would not be cut.

In summary the initial fuel control routines offer the following advantages:

With the engine restart (from vehicle stop or low-speed coasting) activated by the release of the brake pedal, the engine can be restarted and set at idle speed, and thus configured to be ready to creep or accelerate the vehicle. The present invention has an engine computer that tracks the release of the brake pedal, and when a certain brake pressure is reached thereby causing the engine to be turned by the electric motor and engine firing is initiated after the power train computer detects conditions met for several parameters as set-forth herein, including engine speed and MAP, to ensure a smooth clean start. The arrangement avoids the prior art disadvantages of operating an electric drive during creep in a manner to undesirably dissipate much of a small battery charge. A further prior art disadvantage is avoided since the creep or low-speed coasting and reset of engine to idle conditions is obtained without the additional need to depress the accelerator pedal causing a lag in the engine start process (and in vehicle launch).

We claim:

1. A fuel management control method for a hybrid electric vehicle drive having a transmission with gear settings, an internal combustion engine and an electric motor arranged in parallel such that both can propel the vehicle; the system including an electric motor driven fuel pump and a programmable microprocessor the method comprising the steps of monitoring vehicle speed;

sensing braking pressure;

shutting-off fuel flow to the gas engine in response to vehicle braking at predetermined vehicle speeds and gear settings and maintaining the fuel shut off during vehicle coasting while controlling the electric motor to provide either engine starting or regenerative braking depending upon the vehicle speed; and a torque converter having a mechanical one-way clutch connected between the pump and turbine of the torque converter that free wheels in the input drive direction so that the engine can be started by the electric motor and wherein the one-way clutch locks to directly connect the torque converter turbine and impeller during any back drive produced during vehicle coasting to prevent engine stall.

2. The method of claim 1, wherein brake pedal operation at vehicle speeds below a predetermined speed cuts off fuel and controlling the electric motor to produce regenerative braking when the vehicle transmission is in a forward drive mode and decelerating to a drop-to-neutral speed.

3. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation; and providing a multi-speed transmission with a forward and reverse mode and having a low speed in which vehicle speed is below 10 mph and a high-speed range and wherein the fuel cut-off occurs when the vehicle transmission is in the forward drive mode and in the low speed range.

4. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; and controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation, wherein the fuel cut-off is initiated by gas pedal release and brake pedal application when the vehicle speed is greater than a predetermined value and is initiated by the brake when the vehicle speed is less than said predetermined value.

5. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation; and providing a multi-speed transmission; monitoring the gear setting and above a predetermined higher gear setting and above a critical speed V determining release of the gas pedal; and initiating a engine fuel-off sequence in response to such gas pedal release, wherein the method further includes providing a timer and delaying the beginning of the fuel cutoff sequence by the timer following gas pedal release.

6. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; controlling the electric motor to charge batteries during vehicle deceleration/ coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation; and providing a multi-speed transmission; monitoring the gear setting and above a predetermined higher gear setting and above a critical speed V determining release of the gas pedal; and providing a multi-cylinder gas engine with a fuel cut-off at each cylinder and providing the fuel cutoff sequence by cutting fuel feed to one cylinder at a time to provide a smooth deceleration feel.

7. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; controlling the electric motor to charge batteries during vehicle deceleration/ coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation; and detecting a high speed and determining if the fuel is shut off (by either release of gas pedal or application of brake); coasting the vehicle with neither gas or brake pedal application to a drop-to-neutral velocity; and operating the torque converter locking clutch to back drive the engine until some low engine RPM at which compression pulses of the engine become objectionable; providing a multi-speed transmission operative in a low speed range and maintain coasting by freewheel at the drop-to-neutral velocity; and providing fuel and spark delivery to the engine just before the drop-to-neutral velocity so as to not stall the engine.

8. The method of claim 7 wherein the drop-to-neutral velocity is calibrated as a function of deceleration rate.

9. The method of claim 7 including the step of starting a stalled engine from a no-pedal condition by applying the gas pedal.

10. The method of claim 7 further comprising setting a hybrid-active vehicle speed that must be exceeded to enable any fuel cut-off by brake or gas pedal operation; and further providing a speed hysteresis in the hybrid-active speed having a hybrid-active speed for acceleration Va, and having another for deceleration Vd and wherein the quantification of acceleration/deceleration determined by whether the driver has applied the gas pedal just before the fuel-off command.

11. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation; and setting a hybrid-active vehicle speed that must be exceeded to enable any fuel cut-off by brake or gas pedal operation; and further providing a speed hysteresis in the hybrid-active speed having a hybrid-active speed for acceleration Va, and having another for deceleration Vd and wherein the quantification of acceleration/deceleration determined by whether the driver has applied the gas pedal just before the fuel-off command.

12. A fuel management control method for a hybrid electric vehicle drive having an internal combustion engine and an electric motor arranged in parallel such that both can propel the vehicle; the system including an electric motor driven fuel pump and a programmable microprocessor the method comprising: providing a belt drive connection between the electric motor and the engine; providing a torque converter with an impeller turbine connection through a forward drive free wheeling and reverse drive locking one-way clutch connection in the vehicle drive; controlling the electric motor to charge batteries during vehicle deceleration/coasting operation and during regular cruising if the battery state of charge is low and cutting off fuel flow to the engine in response to either gas pedal or brake operation while the torque converter is operative thereby to synchronize overdrive of the vehicle during coasting with the engine speed to prevent the internal combustion engine from stalling upon fuel flow cut-off during such coasting operation; and determining if the engine temperature is above a prescribed threshold and controlling the electric motor such that the engine does not have to be re-cranked when an ignition key is turned to run (but not all the way to crank) and a PRNDL lever is shifted into drive (D) and the brake pedal is released, the electric motor operating creep the vehicle forward and start the engine as fuel flow commences.

13. The method of claim 12 including monitoring engine temperature, road grade, and vehicle turning to adjust the calibration of the hybridization or the level of drive required from the electric motor and from the internal combustion engine during such creep forward operation; wherein when the vehicle is cold, the fuel is not turned off and on to optimize fuel consumption since electric motor start only would constitute an unnecessary drain on the battery pack and wherein when the road grade is too great the fuel is not cut off, additionally, the fuel cutoff algorithm is readjusted when making hard turns (at speed) or tight turns (at low speeds) to enhance driveability.

14. A method for controlling a hybrid vehicle drive comprising an internal combustion engine and an electric motor generator connected to the crankshaft of the internal combustion engine by a direct drive belt and wherein the electric motor is utilized to charge batteries during vehicle deceleration/coasting operation comprising the steps of:
  monitoring vehicle speed to determine one of a brake start speed range; a hysteresis speed range and a regenerative braking speed range;
  initiating a combination of fuel flow to the engine and start of the engine with the electric motor when the speed of the vehicle is at or below the brake start speed range and below the maximum speed of the hysteresis speed range;

providing a brake pedal and a brake switch responsive to brake pedal pressure for producing an input signal;

and operating the vehicle in a deceleration and engine stall mode wherein the fuel supply to the engine is cutoff if the brake pedal is initially depressed when the speed of the vehicle is above a maximum hysteresis speed.

15. In the control method of claim 14, operating the vehicle in a coast mode with the fuel cut-off if the brake signal is initially zero following detection of a vehicle speed greater than a maximum hysteresis speed.

16. In the control method of claim 15, periodically determining brake pedal operation and operating the vehicle in said deceleration mode following coasting when the brake pedal is depressed following initial release thereof.

17. In the control method of claim 16, during operation in the deceleration mode periodically checking brake pedal operation and reestablishing fuel flow to the gas engine upon detection of brake release.

18. In the control method of claim 17, controlling the electric motor to start the gas engine when fuel flow to the engine is re-established.

19. In the control method of claim 14, establishing that the vehicle is operating at speed above the brake start range;

operating the vehicle in a hysteresis range at or below the maximum hysteresis speed;

determining whether the vehicle roll from stop speed is greater or less than the maximum hysteresis speed;

if the speed is less than the maximum hysteresis speed maintaining fuel flow to the engine at all times so long as the vehicle speed exceeds the brake start speed.

20. A method for controlling a hybrid vehicle drive comprising an internal combustion engine and an electric motor generator connected to the crankshaft of the internal combustion engine by a direct drive belt and wherein the electric motor is utilized to charge batteries during vehicle deceleration/coasting operation and during regular cruising if battery charge is low comprising the steps of:

monitoring vehicle speed;

providing a brake pedal and a brake switch responsive to brake pedal pressure for producing an input signal;

determining fuel gas pedal operation; if gas pedal depressed maintain fuel flow to the internal combustion engine under the control of the gas pedal;

if the vehicle is stopped with fuel off releasing brake to produce a brake position signal and operating said electric motor in accordance with the brake position signal to electrically turn the internal combustion engine to increase the vehicle speed to a predetermined creep speed; and providing fuel and spark to the internal combustion engine when the engine speed and vehicle speed reach predetermined values.

21. In the control method of claim 20, operating the vehicle by providing fuel and spark to the internal combustion engine to accelerate the vehicle to a speed in excess of a predetermined speed and depress gas pedal to start engine by delivering fuel and spark to the internal combustion engine.

22. In the control method of claim 20, above a predetermined speed periodically determining brake pedal operation and operating the vehicle in a deceleration mode by depressing brake and conditioning said electric motor to produce regenerative braking.

23. In the control method of claim 20, during operation above the predetermined speed and in the deceleration mode if operating the gas pedal to cut off fuel flow with neither brake pedal or gas pedal applied allowing said vehicle to drop-to-neutral or stall speed; thereafter operating the gas pedal and conditioning the electric motor to start the gas engine with the electric motor.

24. In the control method of claim 22, depressing the brake to decelerate the vehicle and drop to a drop-to-neutral speed by placing gear in low speed range and maintaining coasting by freewheel and restarting the internal combustion engine by the electric motor when the brake is released.

25. In the control method of claim 20 determining the vehicle speed to be below the stall speed and above a minimum speed of a hysteresis speed range and while operating the vehicle in a deceleration and engine stall mode and causing the fuel supply to the engine to be cutoff and starting the engine with the electric motor upon brake release during such deceleration and engine stall mode.

* * * * *